(12) United States Patent
Miyatake et al.

(10) Patent No.: US 12,334,496 B2
(45) Date of Patent: *Jun. 17, 2025

(54) SOLID ELECTROLYTE COMPOSITION AND SOLID ELECTROLYTE PARTICLES

(71) Applicant: Panasonic Intellectual Property Management Co., Ltd., Osaka (JP)

(72) Inventors: Kazufumi Miyatake, Osaka (JP); Yusuke Nishio, Osaka (JP); Takashi Kubo, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 498 days.

This patent is subject to a terminal disclaimer.

(21) Appl. No.: 17/664,514

(22) Filed: May 23, 2022

(65) Prior Publication Data

US 2022/0285721 A1 Sep. 8, 2022

Related U.S. Application Data

(63) Continuation of application No. PCT/JP2020/043098, filed on Nov. 19, 2020.

(30) Foreign Application Priority Data

Dec. 27, 2019 (JP) ................................ 2019-238471

(51) Int. Cl.
*H01M 10/056* (2010.01)

(52) U.S. Cl.
CPC .... *H01M 10/056* (2013.01); *H01M 2300/008* (2013.01)

(58) Field of Classification Search
None
See application file for complete search history.

(56) References Cited

U.S. PATENT DOCUMENTS

| | | | | |
|---|---|---|---|---|
| 11,524,902 | B2* | 12/2022 | Asano | H01M 4/525 |
| 11,848,414 | B2* | 12/2023 | Assat | H01M 10/0562 |
| 12,132,171 | B2* | 10/2024 | Isojima | H01M 4/62 |
| 12,166,173 | B2* | 12/2024 | Francisco | C03C 10/0027 |
| 12,199,236 | B2* | 1/2025 | Shibata | H01M 10/052 |
| 2016/0190638 | A1* | 6/2016 | Sugiura | H01M 10/0562 429/189 |
| 2016/0268661 | A1* | 9/2016 | Kim | H01M 10/0568 |
| 2018/0309167 | A1* | 10/2018 | Kaga | H01M 4/661 |
| 2019/0080814 | A1* | 3/2019 | Shimada | H01B 1/06 |
| 2019/0088995 | A1 | 3/2019 | Asano et al. | |
| 2020/0127325 | A1* | 4/2020 | Takahashi | H01M 4/133 |
| 2020/0328453 | A1 | 10/2020 | Sakai et al. | |
| 2020/0350628 | A1 | 11/2020 | Isojima et al. | |
| 2020/0373612 | A1* | 11/2020 | Yamada | C03C 10/00 |
| 2021/0328262 | A1* | 10/2021 | Nishio | H01M 10/0562 |
| 2022/0294012 | A1* | 9/2022 | Nishio | H01M 10/052 |
| 2022/0320571 | A1* | 10/2022 | Hirano | H01M 10/0562 |
| 2022/0376292 | A1* | 11/2022 | Assat | H01M 10/0562 |

FOREIGN PATENT DOCUMENTS

| | | |
|---|---|---|
| EP | 3432320 A1 | 1/2019 |
| EP | 3598462 A1 | 1/2020 |
| EP | 3993108 A1 | 5/2022 |
| JP | 63-256130 A | 10/1988 |
| JP | 10-321256 A | 12/1998 |
| WO | 2018/025582 | 2/2018 |
| WO | WO-2018025582 A1 * | 2/2018 .............. C01F 17/36 |
| WO | 2018/168754 A1 | 9/2018 |
| WO | 2019/135315 | 7/2019 |
| WO | 2019/151373 | 8/2019 |

OTHER PUBLICATIONS

Zevgolis et al. NPL (App. Phys. Let. Mat., Nov. 1, 2017) (Year: 2017).*
Li et al. NPL (Energy & Envir. Sci., 2020) (Year: 2020).*
Bohnsack et al. NPL (Z. anorg. allg. Chem., 623, 1997, 1067-1073). (Year: 1997).*
Abstract Translation of WO 2018-025582-A1 (Year: 2018).*
International Search Report of PCT application No. PCT/JP2020/043098 dated Dec. 15, 2020.
The Office Action dated May 27, 2024, for the related European Patent Application No. 20906661.2.

* cited by examiner

Primary Examiner — Kevin M Bernatz
(74) Attorney, Agent, or Firm — GREENBLUM & BERNSTEIN, P.L.C.

(57) ABSTRACT

A solid electrolyte composition according to the present disclosure includes a halide solid electrolyte material and an organic solvent. The halide solid electrolyte material has an average particle size of less than or equal to 1 μm. The organic solvent consists of at least one selected from the group consisting of a compound having a functional group and a hydrocarbon. The functional group includes at least one selected from the group consisting of an ether group and a halogen group.

11 Claims, 5 Drawing Sheets

FIG. 4
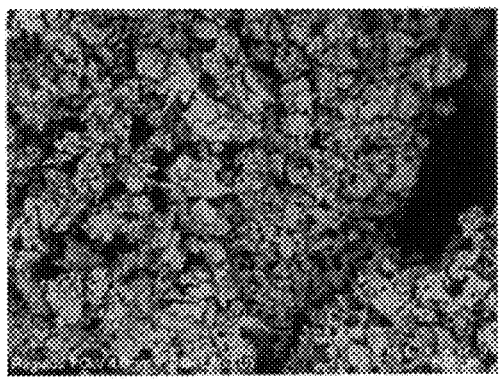
EXAMPLE 1
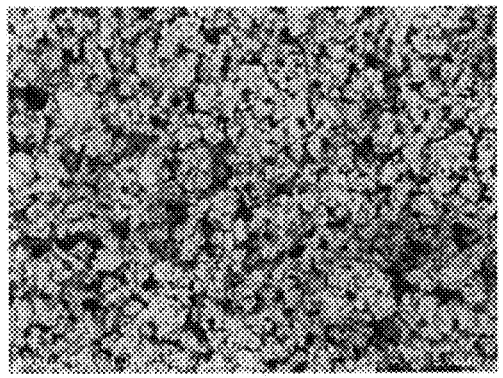
EXAMPLE 2
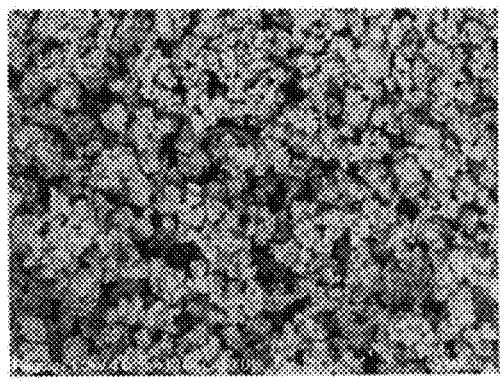
EXAMPLE 3
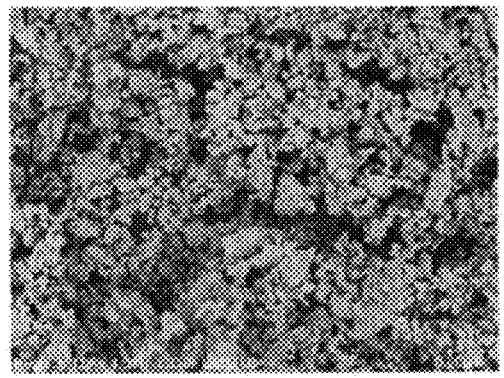
EXAMPLE 4
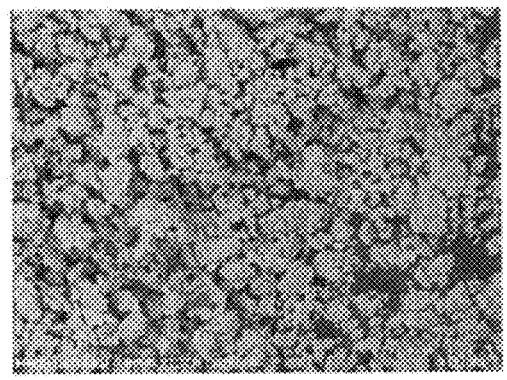
EXAMPLE 5
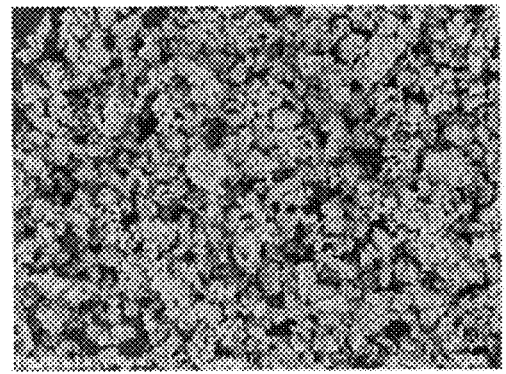
EXAMPLE 6

FIG. 5
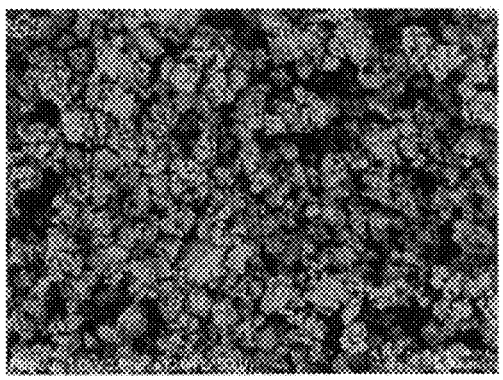
EXAMPLE 7
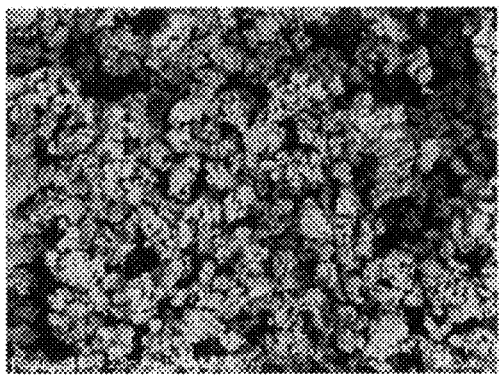
EXAMPLE 8
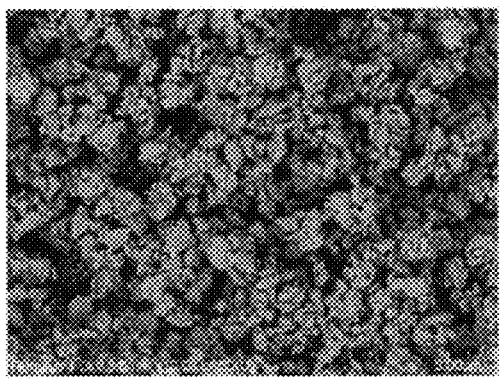
EXAMPLE 9
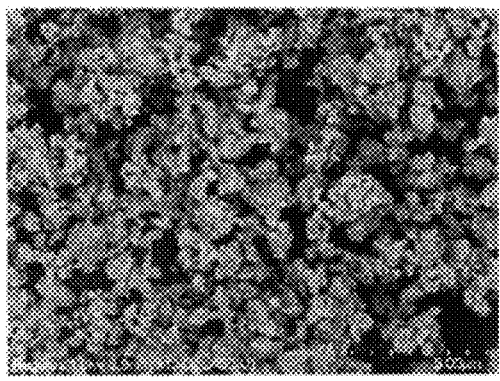
EXAMPLE 10
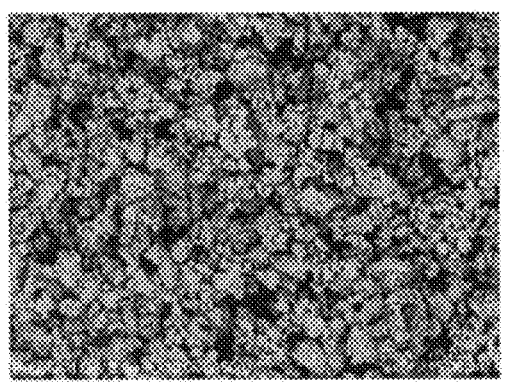
EXAMPLE 11
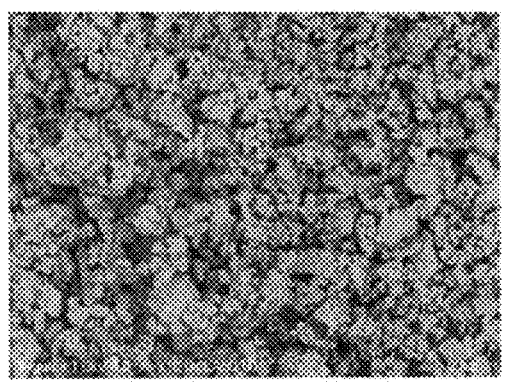
EXAMPLE 12

FIG. 6
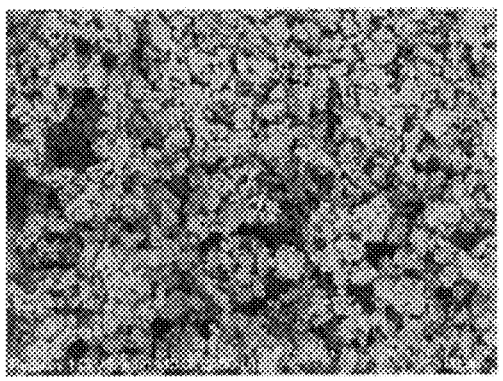
EXAMPLE 13
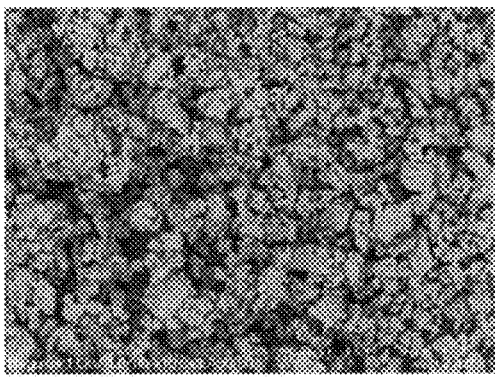
EXAMPLE 14
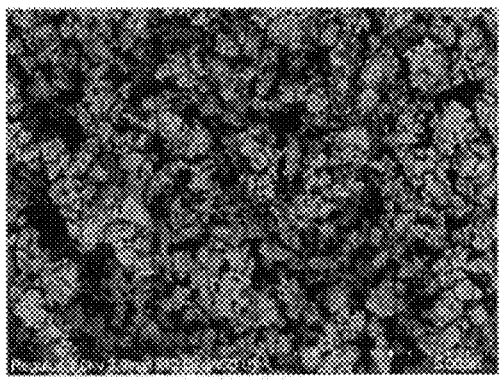
EXAMPLE 15
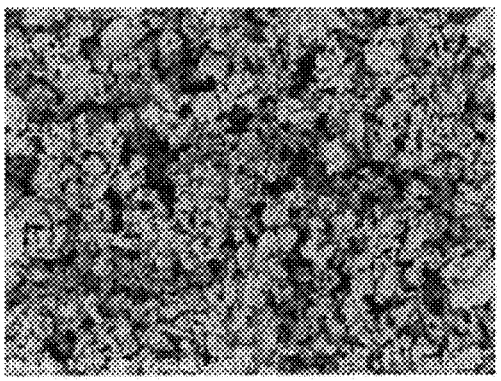
EXAMPLE 16
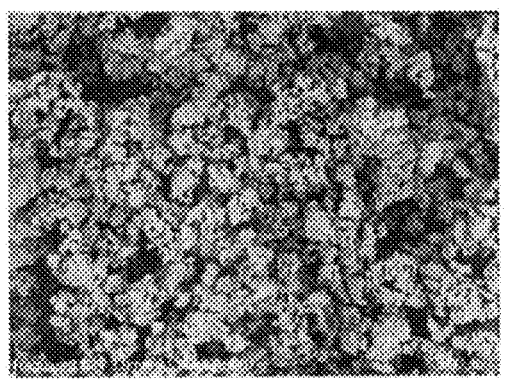
EXAMPLE 17
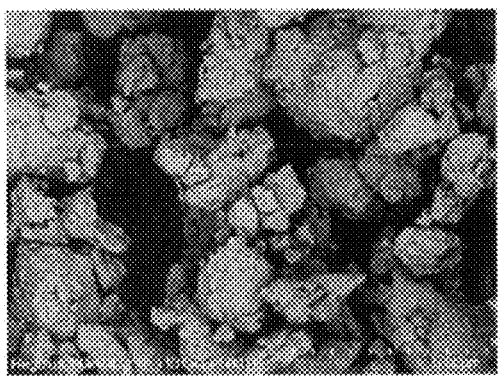
COMPARATIVE EXAMPLE 4

SOLID ELECTROLYTE COMPOSITION AND SOLID ELECTROLYTE PARTICLES

BACKGROUND

1. Technical Field

The present disclosure relates to a solid electrolyte composition and solid electrolyte particles.

2. Description of the Related Art

International Publication No. 2018/025582 discloses a battery using a halide solid electrolyte material.

SUMMARY

One non-limiting and exemplary embodiment provides a solid electrolyte composition in which, while a decrease in the ion conductivity of the solid electrolyte material is suppressed, a reduction in the particle sizes of the solid electrolyte material is achieved.

In one general aspect, the techniques disclosed here feature a solid electrolyte composition including a halide solid electrolyte material and an organic solvent, wherein the halide solid electrolyte material has an average particle size of less than or equal to 1 µm, the organic solvent consists of at least one selected from the group consisting of a compound having a functional group and a hydrocarbon, and the functional group includes at least one selected from the group consisting of an ether group and a halogen group.

The present disclosure provides a solid electrolyte composition in which, while a decrease in the ion conductivity of the solid electrolyte material is suppressed, a reduction in the particle sizes of the solid electrolyte material is achieved.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 4 illustrates images of solid electrolyte particles observed with a scanning electron microscope (SEM) in Examples 1 to 6;

FIG. 5 illustrates images of solid electrolyte particles observed with a scanning electron microscope (SEM) in Examples 7 to 12; and FIG. 6 illustrates images of solid electrolyte particles observed with a scanning electron microscope (SEM) in Examples 13 to 17 and Comparative Example 4.

DETAILED DESCRIPTIONS

Figure 1:
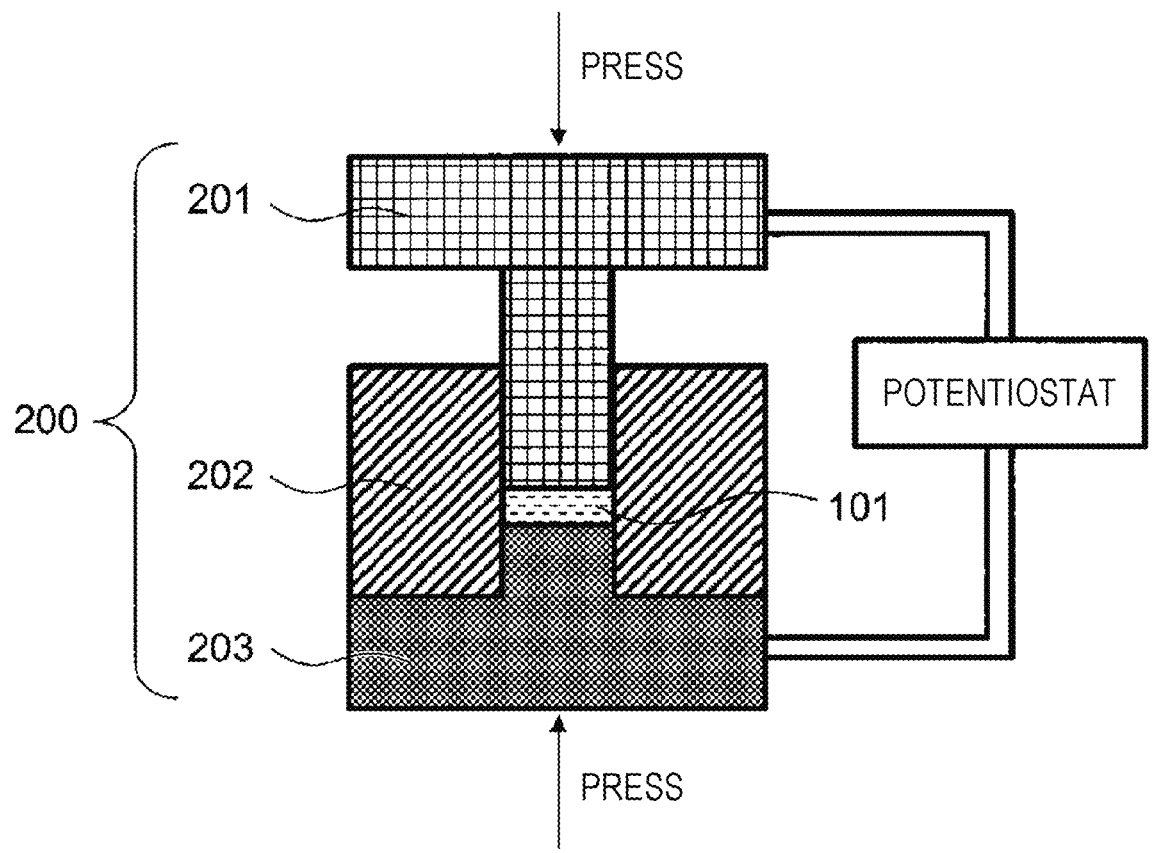
FIG. 1 is a schematic view of a pressure-molding die 200 used for evaluating the lithium-ion conductivity of solid electrolyte particles.

Hereinafter, embodiments according to the present disclosure will be described.

In the field of secondary batteries in which there is a demand for secondary batteries having higher energy density and higher capacity, organic electrolyte solutions in which electrolyte salts are dissolved in organic solvents are dominantly used. For secondary batteries using organic electrolyte solutions, leakage of the solutions may occur and it is also pointed out that, in the case of a short circuit etc., a larger amount of heat may be generated.

On the other hand, all-solid-state secondary batteries using inorganic solid electrolytes instead of organic electrolyte solutions have been attracting attention. All-solid-state secondary batteries do not undergo leakage of solutions. In addition, the inorganic solid electrolytes do not have flammability and hence heat generated in the case of a short circuit etc. is expected to be suppressed.

As known inorganic solid electrolytes used for all-solid-state secondary batteries, there are sulfide-based solid electrolytes including sulfur as the main component and oxide-based solid electrolytes including a metal oxide as the main component. However, the sulfide-based solid electrolytes, in the case of reaction with moisture, may generate hydrogen sulfide, which has toxicity. The oxide-based solid electrolytes have low ion conductivity. For these reasons, there has been a demand for development of a novel solid electrolyte material having high ion conductivity.

As the novel solid electrolyte material, for example, a solid electrolyte material including lithium, yttrium, and a halogen element is considered promising. This solid electrolyte material has ionic bondability. In order to put, into practical use, an all-solid-state secondary battery using the solid electrolyte material having ionic bondability, a composition including the solid electrolyte material having ionic bondability and having fluidity needs to be prepared. Furthermore, a technique of applying the composition having fluidity onto the surface of an electrode or a current collector to form a member such as a solid electrolyte film is necessary. Furthermore, in order to form a thin layer, a technique of reducing the particle sizes of the solid electrolyte material is also necessary.

In order to obtain a solid electrolyte material having particle sizes on the micrometer order, a solid electrolyte material is ground without using solvents. On the other hand, in order to obtain a solid electrolyte material having particle sizes of less than or equal to 1 µm, a solid electrolyte material needs to be mixed with a specific organic solvent and ground. The mixing of the solid electrolyte material with the organic solvent tends to suppress aggregation of the ground solid electrolyte material.

Thus, the present inventors performed studies and, as a result, have found that mixing of a specific organic solvent with a solid electrolyte material can cause a decrease in the lithium-ion conductivity of the solid electrolyte material. Furthermore, they have also found that, depending on the combination of an organic solvent and a solid electrolyte material, reduction in the particle sizes of the solid electrolyte material to less than or equal to 1 µm cannot be achieved. They have focused on such points and have found features of the present disclosure.

First Embodiment

A solid electrolyte composition according to a first embodiment includes a halide solid electrolyte material and an organic solvent. The halide solid electrolyte material has an average particle size of less than or equal to 1 µm. The organic solvent consists of at least one selected from the group consisting of a compound having a functional group and a hydrocarbon. The functional group includes at least one selected from the group consisting of an ether group and a halogen group. The solid electrolyte composition according to the first embodiment can be used to obtain solid electrolyte particles having a high lithium-ion conductivity.

The halide solid electrolyte material may have an average particle size of less than or equal to 1 μm, less than or equal to 0.8 μm, less than or equal to 0.7 μm, or less than or equal to 0.6 μm. The lower limit value of the average particle size of the halide solid electrolyte material is not particularly limited and may be 0.1 μm or 0.3 μm. Thus, the solid electrolyte composition can be used for forming thin films of electrode layers and electrolyte layers. As a result, batteries having high energy density can be provided. These batteries are, for example, all-solid-state secondary batteries.

The organic solvent consists of at least one selected from the group consisting of a compound having a functional group and a hydrocarbon.

The hydrocarbon is a compound composed only of carbon and hydrogen. The hydrocarbon may be an aliphatic hydrocarbon. The hydrocarbon may be a saturated hydrocarbon or an unsaturated hydrocarbon. The hydrocarbon may be linear or branched.

The hydrocarbon may have a cyclic structure. The cyclic structure may be an alicyclic hydrocarbon or an aromatic hydrocarbon. The cyclic structure may be monocyclic or polycyclic. When the hydrocarbon has a cyclic structure, the halide solid electrolyte material can be easily dispersed in the organic solvent. From the viewpoint of improving the dispersibility of the halide solid electrolyte material in the solid electrolyte composition, the hydrocarbon may include an aromatic hydrocarbon. The hydrocarbon may be an aromatic hydrocarbon.

The compound having a functional group may be, except for the functional group, composed only of carbon and hydrogen. Specifically, the compound having a functional group means a compound in which at least one hydrogen atom included in a hydrocarbon is substituted with the functional group. Examples of the functional group include an ether group and halogen groups. The functional group may include at least one selected from the group consisting of an ether group and a halogen group. As the halogen group, at least one selected from the group consisting of F, Cl, Br, and I may be used. The functional group may be at least one selected from the group consisting of an ether group and a halogen group.

The compound having a functional group may not substantially include a functional group other than an ether group and halogen groups. Specifically, the compound having a functional group has, as the functional group, only an ether group or a halogen group. Use of such a compound can achieve easy dispersion of the halide solid electrolyte material. The halide solid electrolyte material can be easily dispersed in the compound having a functional group, so that denser solid electrolyte particles can be formed. This enables, for example, formation of a solid electrolyte layer having less pinholes or irregularities. This results in formation of a battery having a high energy density.

The organic solvent may include a compound having a halogen group. The halide solid electrolyte material can be easily dispersed in the compound having a halogen group. As a result, in the solid electrolyte composition, the decrease in the ion conductivity can be suppressed. From the viewpoint of dispersibility of the halide solid electrolyte material, the halogen group may be a chloro group.

The compound having a functional group may have a cyclic structure. The cyclic structure may be an alicyclic hydrocarbon or an aromatic hydrocarbon. The cyclic structure may be monocyclic or polycyclic. When the compound having a functional group has a cyclic structure, the halide solid electrolyte material can be easily dispersed in the organic solvent.

From the viewpoint of improving the dispersibility of the halide solid electrolyte material, the organic solvent may be an aromatic compound. Specifically, the hydrocarbon may be an aromatic hydrocarbon. The compound having a functional group may be an aromatic compound having a functional group. The organic solvent may include at least one selected from the group consisting of an aromatic compound having a functional group and an aromatic hydrocarbon.

Specifically, the organic solvent may include at least one selected from the group consisting of tetralin, ethylbenzene, mesitylene, pseudocumene, xylene, cumene, anisole, 1,2,4-trichlorobenzene, chlorobenzene, 2,4-dichlorotoluene, o-chlorotoluene, 1,3-dichlorobenzene, p-chlorotoluene, 1,2-dichlorobenzene, 3,4-dichlorotoluene, dibutyl ether, and 1,4-dichlorobutane.

The ratio of the mass of the organic solvent to the mass of the solid electrolyte composition may be greater than or equal to 10 mass %, or greater than or equal to 50 mass %. In this case, the solid electrolyte composition can have high dispersion stability. The upper limit value of the ratio of the mass of the organic solvent to the mass of the solid electrolyte composition is not particularly limited, and may be 80 mass % or 90 mass %. The ratio of the mass of the organic solvent to the mass of the solid electrolyte composition may be, for example, greater than or equal to 30 mass % and less than or equal to 70 mass %.

The boiling point of the organic solvent is not particularly limited, and may be higher than or equal to 100° C., higher than or equal to 130° C., or higher than or equal to 200° C. The upper limit value of the boiling point of the organic solvent is not particularly limited, and may be 250° C. The organic solvent, which is a liquid in which the halide solid electrolyte material is dispersible, may be an organic solvent in which the halide solid electrolyte material is not completely dissolved.

In the present disclosure, "halide solid electrolyte material" means a solid electrolyte material including a halogen element, but not including sulfur. In the present disclosure, "solid electrolyte material not including sulfur" means a solid electrolyte material represented by a composition formula not including the sulfur element. Thus, a solid electrolyte material including a very small amount of a sulfur component, for example, having a sulfur content of less than or equal to 0.1 mass % is encompassed by the solid electrolyte material not including sulfur. The halide solid electrolyte material may further include, as an anion other than halogen elements, oxygen.

The halide solid electrolyte material may have lithium-ion conductivity.

The halide solid electrolyte material may include at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm.

The halide solid electrolyte material may further include at least one selected from the group consisting of F, Cl, Br, and I.

In the solid electrolyte composition having such features, the decrease in the ion conductivity can be suppressed.

The halide solid electrolyte material may include at least one selected from the group consisting of F, Cl, Br, and I, Li, and Y.

The halide solid electrolyte material may include Li, Y, Cl, and Br. More specifically, the halide solid electrolyte material may be $Li_3YBr_2Cl_4$.

In the solid electrolyte composition having such features, the decrease in the ion conductivity can be suppressed.

The halide solid electrolyte material may be a material represented by Composition formula (1): $Li_\alpha M_\beta X_\gamma$ where $\alpha$, $\beta$, and $\gamma$ each independently represent a value greater than 0; M is at least one selected from the group consisting of a metallic element other than Li and a metalloid element; and X is at least one selected from the group consisting of Cl, Br, and I.

In the present disclosure, "metalloid element" means at least one selected from the group consisting of B, Si, Ge, As, Sb, and Te.

In the present disclosure, "metallic element" means (i) all the elements, except for hydrogen, included in group 1 to group 12 in the periodic table, and (ii) all the elements, except for B, Si, Ge, As, Sb, Te, C, N, P, O, S, and Se, included in group 13 to group 16 in the periodic table.

In Composition formula (1), M may include Y (yttrium). Specifically, the halide solid electrolyte material may include, as the metallic element M, Y. The halide solid electrolyte material has a high ion conductivity. Thus, the halide solid electrolyte material can be used for obtaining all-solid-state batteries having high charging efficiency.

Alternatively, the halide solid electrolyte material including Y may be a compound represented by Composition formula (2): $Li_a Me_b Y_c X_6$ where $a+mb+3c=6$ and $c>0$ are satisfied; Me is at least one selected from the group consisting of a metallic element other than Li and Y and a metalloid element; and m is the charge number of Me.

Me may be at least one selected from the group consisting of Mg, Ca, Sr, Ba, Zn, Sc, Al, Ga, Bi, Zr, Hf, Ti, Sn, Ta, and Nb. In this case, the halide solid electrolyte material has a higher ion conductivity.

Alternatively, the halide solid electrolyte material may be a material represented by Composition formula (3): $Li_{6-3\delta}Y_\delta X_\delta$ where X is at least one selected from the group consisting of Cl, Br, and I; and $0<\delta<2$ is satisfied.

In Composition formula (3), $\delta=1$ may be satisfied. Specifically, the halide solid electrolyte material may be a material represented by Composition formula (4): $Li_3YX_6$.

Alternatively, the halide solid electrolyte material may be a material represented by Composition formula (5): $Li_{3-3\delta}Y_{1+\delta}Cl_\delta$ where $0<\delta\leq0.15$ is satisfied.

Alternatively, the halide solid electrolyte material may be a material represented by Composition formula (6): $Li_{3-3\delta}Y_{1+\delta}Br_6$ where $0<\delta\leq0.25$ is satisfied.

Alternatively, the halide solid electrolyte material may be a material represented by Composition formula (7): $Li_{3-3\delta+a}Y_{1+\delta-a}Me_aCl_{6-x-y}Br_xI_y$ where Me is at least one selected from the group consisting of Mg, Ca, Sr, Ba, and Zn; and $-1<\delta<2$, $0<a<3$, $0<(3-3\delta+a)$, $0<(1+\delta-a)$, $0\leq x\leq 6$, $0\leq y\leq 6$, and $(x+y)\leq 6$ are satisfied.

Alternatively, the halide solid electrolyte material may be a material represented by Composition formula (8): $Li_{3-3\delta}Y_{1+\delta-a}Me_aCl_{6-x-y}Br_xI_y$ where Me is at least one selected from the group consisting of Al, Sc, Ga, and Bi; and $-1<\delta<1$, $0<a<2$, $0<(1+\delta-a)$, $0\leq x\leq 6$, $0\leq y\leq 6$, and $(x+y)\leq 6$ are satisfied.

Alternatively, the halide solid electrolyte material may be a material represented by Composition formula (9): $Li_{3-3\delta-a}Y_{1+\delta-a}Me_aCl_{6-x-y}Br_xI_y$ where Me is at least one selected from the group consisting of Zr, Hf, and Ti; and $-1<\delta<1$, $0<a<1.5$, $0<(3-3\delta-a)$, $0<(1+\delta-a)$, $0\leq x\leq 6$, $0\leq y\leq 6$, and $(x+y)\leq 6$ are satisfied.

Alternatively, the halide solid electrolyte material may be a material represented by Composition formula (10): $Li_{3-3\delta-2a}Y_{1+\delta-a}Me_aCl_{6-x-y}Br_xI_y$ where Me is at least one selected from the group consisting of Ta and Nb; and $-1<\delta<1$, $0<a<1.2$, $0<(3-3\delta-2a)$, $0<(1+\delta-a)$, $0\leq x\leq 6$, $0\leq y\leq 6$, and $(x+y)\leq 6$ are satisfied.

The halide solid electrolyte materials represented by Composition formula (1) to Composition formula (10) have high ion conductivities. Thus, the halide solid electrolyte materials of Composition formula (1) to Composition formula (10) can be used for obtaining all-solid-state batteries having high charging efficiency.

Figure 2:
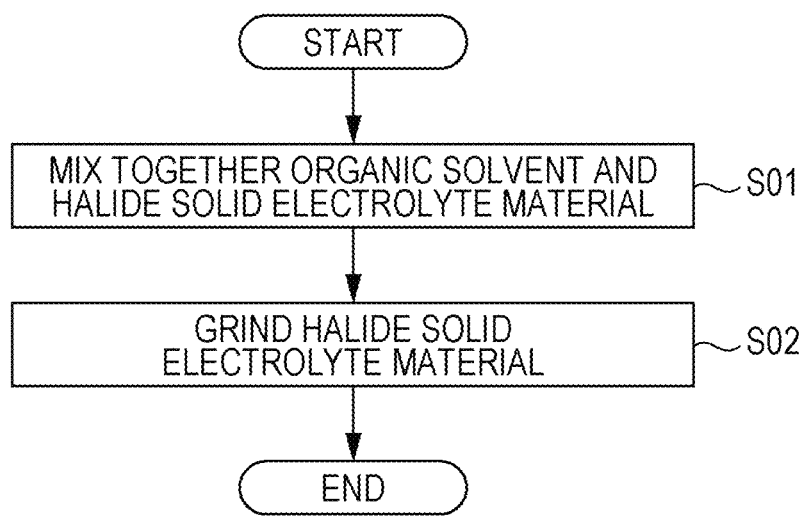
FIG. 2 is a flow chart illustrating a method for producing a solid electrolyte composition.

Hereinafter, a method for producing a solid electrolyte composition will be described with reference to FIG. 2. FIG. 2 is a flow chart illustrating the method for producing a solid electrolyte composition.

The method for producing a solid electrolyte composition may include Step S01 and Step S02. Step S01 is a step of mixing together an organic solvent and a halide solid electrolyte material. Step S02 is a step of reducing the particle sizes of the halide solid electrolyte material. Step S01 and Step S02 may be performed in this order.

In Step S01, the organic solvent and the halide solid electrolyte material are mixed together. This provides a mixture of the organic solvent and the halide solid electrolyte material. In the mixture, the content of the organic solvent and the content of the halide solid electrolyte material are not particularly limited. The mass of the halide solid electrolyte material relative to the mass of the mixture may be greater than or equal to 10 mass % and less than or equal to 90 mass %, or greater than or equal to 30 mass % and less than or equal to 70 mass %.

In Step S02, the particle sizes of the halide solid electrolyte material are reduced. For example, the halide solid electrolyte material is ground. The grinding is performed using grinding media. The grinding media are, for example, zirconia balls. The grinding media have a spherical or cylindrical shape, for example. The particle sizes of the ground halide solid electrolyte material considerably depend on the size of the grinding media. When the grinding media have a spherical shape, the grinding media have a diameter of, for example, less than or equal to 1.0 mm.

In Step S02, into a container, the organic solvent, the halide solid electrolyte material, and the grinding media are placed. Subsequently, the container is rotated, to thereby grind the halide solid electrolyte material. This is a grinding process referred to as a roll mill, a pot mill, or a planetary ball mill. Into a grinding chamber equipped with a rotor, the grinding media are placed and then the rotor is rotated. Into the grinding chamber being rotated, a mixture including the organic solvent and the halide solid electrolyte material may be placed and the halide solid electrolyte material may be ground.

After the grinding, for example, a sieve is used to separate the solid electrolyte composition from the grinding media. The mixture including the ground halide solid electrolyte material and the organic solvent is referred to as "solid electrolyte composition". In such a production method, the halide solid electrolyte material can be easily dispersed in the organic solvent, so that a solid electrolyte composition having high dispersibility can be obtained. As a result, from the solid electrolyte composition, solid electrolyte particles having high lithium-ion conductivity can be obtained. From the solid electrolyte composition, for example, a dense solid electrolyte film having less pinholes, irregularities, etc. can be easily formed.

Second Embodiment

Hereinafter, a second embodiment will be described.

Solid electrolyte particles are a solidified product of a solid electrolyte composition. The solid electrolyte particles can be obtained by, for example, removing the organic solvent from the solid electrolyte composition. Specifically, the solid electrolyte composition can be solidified, to thereby obtain solid electrolyte particles. The solid electrolyte particles have high ion conductivity. Thus, the solid electrolyte particles can be used for obtaining batteries having high charging efficiency.

The solid electrolyte particles may have an average particle size of less than or equal to 1 μm, less than or equal to 0.8 μm, less than or equal to 0.7 μm, or less than or equal to 0.6 μm. The lower limit value of the average particle size of the solid electrolyte particles is not particularly limited, and may be 0.1 μm or 0.3 μm. The solid electrolyte particles can be used for forming thin films of electrode layers and electrolyte layers.

The particle sizes of the solid electrolyte particles are measured by a scanning electron microscope (SEM). A group of the particles is observed using the electron microscope; in the electron microscope image, the Feret diameters of specified particles are measured. For a given number (for example, 30) of particles, the Feret diameters are calculated and the average thereof is defined as the average particle size of the solid electrolyte particles.

The solid electrolyte particles, even after removal of the organic solvent from the solid electrolyte composition, can include a small amount of the organic solvent. The organic solvent is detected using, for example, a gas chromatograph.

Figure 3:
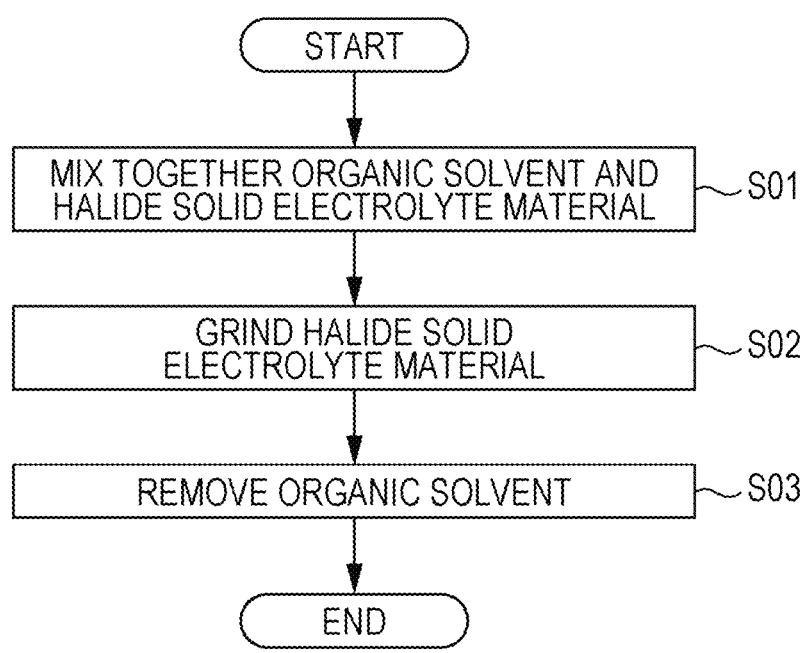
FIG. 3 is a flow chart illustrating a method for producing solid electrolyte particles.

Hereinafter, a method for producing solid electrolyte particles will be described with reference to FIG. 3. FIG. 3 is a flow chart illustrating the method for producing solid electrolyte particles.

The method for producing solid electrolyte particles may include Step S01, Step S02, and Step S03. Step S01 and Step S02 in FIG. 3 have been described in the first embodiment. The method for producing solid electrolyte particles includes Step S03 of removing the organic solvent from the above-described solid electrolyte composition in the first embodiment. Step S01, Step S02, and Step S03 may be performed in this order.

In Step S03, the organic solvent is removed from the solid electrolyte composition.

The organic solvent may be removed by drying under a reduced pressure from the solid electrolyte composition. Specifically, in an atmosphere at a pressure lower than atmospheric pressure, the organic solvent may be removed from the solid electrolyte composition. The atmosphere at a pressure lower than atmospheric pressure may have a gauge pressure of, for example, less than or equal to −0.01 MPa. The drying under a reduced pressure may be performed at higher than or equal to 50° C. and lower than or equal to 250° C.

The organic solvent may be removed by vacuum drying from the solid electrolyte composition. Specifically, in an atmosphere at a temperature 20° C. lower than the boiling point of the organic solvent and at a pressure less than or equal to the vapor pressure, the organic solvent may be removed from the solid electrolyte composition.

The organic solvent may be removed by, in an environment under flow of an inert gas, heating the solid electrolyte composition, from the solid electrolyte composition. The inert gas is, for example, nitrogen or argon. The heating temperature is, for example, higher than or equal to 50° C. and lower than or equal to 250° C.

Removal of the organic solvent can be confirmed by, for example, Fourier transform infrared spectroscopy (FT-IR), X-ray photoelectron spectroscopy (XPS), gas chromatography (GC), or gas chromatography mass spectroscopy (GC/MS). Note that, as long as the dried solid electrolyte particles have ion conductivity, the organic solvent may not be completely removed.

EXAMPLES

Hereinafter, the present disclosure will be described further in detail with reference to Examples.

Example 1

Preparation of Halide Solid Electrolyte Material

In an argon atmosphere having a dew point of lower than or equal to −60° C. (hereafter, referred to as "dry argon atmosphere"), raw material powders of LiBr, LiCl, and $YCl_3$ were prepared in a molar ratio $LiBr:LiCl:YCl_3=2:1:1$. These raw material powders were ground in a mortar and mixed together. The obtained mixed powder was, in an alumina crucible, heat-treated at 500° C. for 1 hour and then ground in a mortar. In this way, a halide solid electrolyte material represented by a composition formula $Li_3YBr_2Cl_4$ (hereafter, referred to as "LYBC") was obtained. LYBC was found to have an average particle size of about 20 μm.

Preparation of Solid Electrolyte Composition

Into a planetary-ball-mill grinding pot, 4 g of LYBC was added. Into the planetary-ball-mill grinding pot, 16 g of tetralin was added, and stirring was performed using a spatula.

To the planetary-ball-mill grinding pot, 25 g of zirconia balls having a diameter of 0.5 mm were added. A planetary ball mill (manufactured by FRITSCH GmbH, model: P-7) was used to perform grinding at 300 rpm for 60 minutes. Subsequently, a sieve having an opening size of 212 μm was used to separate the zirconia balls from the solid electrolyte composition. In this way, the solid electrolyte composition of Example 1 was obtained.

Removal of Organic Solvent

Into a glass beaker, the solid electrolyte composition of Example 1 was placed, and the beaker was sealed. Under a stream of nitrogen at 10 L/min, heating to 200° C. was performed to remove tetralin over 2 hours. In this way, the solid electrolyte particles of Example 1 were obtained. Removal of the organic solvent was visually confirmed.

Measurement of Lithium-Ion Conductivity

FIG. 1 is a schematic view of a pressure-molding die 200 used for evaluating the lithium-ion conductivity of the solid electrolyte particles.

The pressure-molding die 200 included an upper punch 201, a die 202, and a lower punch 203. The die 202 was formed of an insulating polycarbonate. The upper punch 201 and the lower punch 203 were both formed of an electron-conductive stainless steel.

The pressure-molding die 200 illustrated in FIG. 1 was used in the following manner to measure the ion conductivity of the solid electrolyte particles.

In the dry argon atmosphere, solid electrolyte particles 101 of Example 1 were charged into the pressure-molding die 200. The upper punch 201 and the lower punch 203 were used to apply a pressure of 400 MPa to the solid electrolyte particles of Example 1.

Under the application of the pressure, the upper punch 201 and the lower punch 203 were connected to a potentiostat equipped with a frequency response analyzer (Princeton Applied Research, VersaSTAT 4). The upper punch 201 was connected to the working electrode and the potential-measurement terminal. The lower punch 203 was connected to the counter electrode and the reference electrode. An electrochemical impedance measurement method was performed to measure, at 25° C., the lithium-ion conductivity of the solid electrolyte particles of Example 1. The measurement results will be described in Table 1.

Measurement of Average Particle Size

The average particle size of the solid electrolyte particles of Example 1 was measured using a scanning electron microscope (SEM). Randomly, 30 primary particles were selected and the Feret diameters of the primary particles were measured. The average of the Feret diameters of the primary particles was calculated as the average particle size. As the SEM, Regulus 8230 manufactured by Hitachi High-Technologies Corporation was used. The observation magnification was set at ×10000. The measurement results will be illustrated in FIG. 4.

Evaluation of Dispersibility

Into a glass screw-top vial having an inner diameter of 1 cm, about 2 cc of the solid electrolyte composition of Example 1 was placed and the screw-top vial was sealed. After the solid electrolyte composition of Example 1 was left at rest for 24 hours, about 1 cc of the upper portion of the composition was sampled and the solid content ratio thereof was measured. Similarly, about 1 cc of the lower portion of the solid electrolyte composition of Example 1 was sampled and the solid content ratio thereof was measured. Furthermore, the difference between the solid content ratio of the upper portion and the solid content ratio of the lower portion was calculated. The values of the solid content ratios will be described in Table 1. The solid content ratios were measured using a heat-dry moisture analyzer (manufactured by A&D Company, Limited, MX-50). Such a solid content ratio means the ratio of the mass of the halide solid electrolyte material to the whole mass of the solid electrolyte composition.

Reference Example 1

LYBC to be mixed with tetralin was also measured in terms of ion conductivity as in Example 1. As a result, LYBC was found to have an ion conductivity of $1.5 \times 10^{-3}$ S/cm. The solid electrolyte particles of Example 1 were found to have a lithium-ion conductivity of $0.9 \times 10^{-3}$ S/cm. It has been demonstrated that use of the organic solvent of Example 1 achieves suppression of the decrease in the ion conductivity.

Example 2

The same procedures as in Example 1 were performed except that, as the organic solvent, tetralin was replaced by ethylbenzene, to provide a solid electrolyte composition and solid electrolyte particles of Example 2.

Example 3

The same procedures as in Example 1 were performed except that, as the organic solvent, tetralin was replaced by mesitylene, to provide a solid electrolyte composition and solid electrolyte particles of Example 3.

Example 4

The same procedures as in Example 1 were performed except that, as the organic solvent, tetralin was replaced by pseudocumene, to provide a solid electrolyte composition and solid electrolyte particles of Example 4.

Example 5

The same procedures as in Example 1 were performed except that, as the organic solvent, tetralin was replaced by xylene, to provide a solid electrolyte composition and solid electrolyte particles of Example 5.

Example 6

The same procedures as in Example 1 were performed except that, as the organic solvent, tetralin was replaced by cumene, to provide a solid electrolyte composition and solid electrolyte particles of Example 6.

Example 7

The same procedures as in Example 1 were performed except that, as the organic solvent, tetralin was replaced by anisole, to provide a solid electrolyte composition and solid electrolyte particles of Example 7.

Example 8

The same procedures as in Example 1 were performed except that, as the organic solvent, tetralin was replaced by 1,2,4-trichlorobenzene, to provide a solid electrolyte composition and solid electrolyte particles of Example 8.

Example 9

The same procedures as in Example 1 were performed except that, as the organic solvent, tetralin was replaced by chlorobenzene, to provide a solid electrolyte composition and solid electrolyte particles of Example 9.

Example 10

The same procedures as in Example 1 were performed except that, as the organic solvent, tetralin was replaced by 2,4-dichlorotoluene, to provide a solid electrolyte composition and solid electrolyte particles of Example 10.

Example 11

The same procedures as in Example 1 were performed except that, as the organic solvent, tetralin was replaced by o-chlorotoluene, to provide a solid electrolyte composition and solid electrolyte particles of Example 11.

Example 12

The same procedures as in Example 1 were performed except that, as the organic solvent, tetralin was replaced by 1,3-dichlorobenzene, to provide a solid electrolyte composition and solid electrolyte particles of Example 12.

Example 13

The same procedures as in Example 1 were performed except that, as the organic solvent, tetralin was replaced by p-chlorotoluene, to provide a solid electrolyte composition and solid electrolyte particles of Example 13.

Example 14

The same procedures as in Example 1 were performed except that, as the organic solvent, tetralin was replaced by 1,2-dichlorobenzene, to provide a solid electrolyte composition and solid electrolyte particles of Example 14.

Example 15

The same procedures as in Example 1 were performed except that, as the organic solvent, tetralin was replaced by 3,4-dichlorotoluene, to provide a solid electrolyte composition and solid electrolyte particles of Example 15.

Example 16

The same procedures as in Example 1 were performed except that, as the organic solvent, tetralin was replaced by dibutyl ether, to provide a solid electrolyte composition and solid electrolyte particles of Example 16.

Example 17

The same procedures as in Example 1 were performed except that, as the organic solvent, tetralin was replaced by 1,4-dichlorobutane, to provide a solid electrolyte composition and solid electrolyte particles of Example 17.

The solid electrolyte particles of Examples 2 to 17 were measured in terms of ion conductivity as in Example 1. The measurement results will be described in Table 1. The solid electrolyte particles of Examples 2 to 17 were measured in terms of average particle size as in Example 1. The measurement results will be described in Table 1. The solid electrolyte compositions of Examples 2 to 17 were evaluated in terms of dispersibility as in Example 1. The values of the solid content ratios will be described in Table 1.

Comparative Example 1

The same procedures as in Example 1 were performed except that, as the organic solvent, tetralin was replaced by N,N-dimethylaniline, to provide a solid electrolyte composition and solid electrolyte particles of Comparative Example 1.

The solid electrolyte particles of Comparative Example 1 were measured in terms of ion conductivity as in Example 1. As a result, the ion conductivity was found to be $0.02 \times 10^{-3}$ S/cm.

Comparative Example 2

The same experiment as in Example 1 was performed except that, as the organic solvent, tetralin was replaced by 2-ethyl-1-hexanol. However, this did not provide a solid electrolyte composition of Comparative Example 2. LYBC reacted with the organic solvent to form a single mass without being ground.

Comparative Example 3

The same procedures as in Example 1 were performed except that, as the organic solvent, tetralin was replaced by tetraethyl orthosilicate, to provide a solid electrolyte composition and solid electrolyte particles of Comparative Example 3.

In Comparative Example 3, use of tetraethyl orthosilicate resulted in deterioration of the halide solid electrolyte material. This resulted in a considerable increase in the resistance value of the solid electrolyte particles of Comparative Example 3. Thus, the ion conductivity of the solid electrolyte particles of Comparative Example 3 was unmeasurable.

Comparative Example 4

Preparation of Sulfide Solid Electrolyte

In the dry argon atmosphere, raw material powders of $Li_2S$ and $P_2S_5$ were prepared in a molar ratio of $Li_2S:P_2S_5=75:25$. These raw material powders were subjected to a milling treatment using a planetary ball mill (manufactured by FRITSCH GmbH, model: P-7) for 10 hours at 510 rpm. In this way, a glassy solid electrolyte was obtained. The obtained glassy solid electrolyte was heat-treated in the dry argon atmosphere at 270° C. for 2 hours, to provide a glass-ceramic sulfide solid electrolyte represented by $Li_2S$—$P_2S_5$ (hereafter, referred to as "LPS").

The same procedures as in Example 1 were performed except that, as the solid electrolyte material, LYBC was replaced by LPS, to provide a solid electrolyte composition and solid electrolyte particles of Comparative Example 4. However, in the solid electrolyte composition according to Comparative Example 4, LPS serving as the solid electrolyte material was not ground to the average particle size of less than or equal to 1 μm.

The solid electrolyte particles of Comparative Example 4 were measured in terms of ion conductivity as in Example 1. As a result, the ion conductivity was found to be $5.8 \times 10^{-4}$ S/cm. The solid electrolyte particles of Comparative Example 4 were measured in terms of average particle size as in Example 1. As a result, the average particle size was found to be 1.55 μm.

Reference Example 2

LPS to be mixed with tetralin was also measured in terms of ion conductivity as in Example 1. As a result, LPS was found to have an ion conductivity of $7.7 \times 10^{-4}$ S/cm.

FIG. 4 illustrates scanning electron microscope (SEM) images of the solid electrolyte particles of Examples 1 to 6. FIG. 5 illustrates scanning electron microscope (SEM) images of the solid electrolyte particles of Examples 7 to 12. FIG. 6 illustrates scanning electron microscope (SEM) images of the solid electrolyte particles of Examples 13 to 17 and Comparative Example 4. The solid electrolyte particles of Examples were found to have particle sizes of less than or equal to 1 μm. The solid electrolyte particles of Comparative Example 4 were found to have particle sizes of greater than 1 μm.

TABLE 1

| | Solid electrolyte material | Solvent | Functional group | Ion conductivity of solid electrolyte particles (S/cm) | Average particle size of solid electrolyte particles (μm) | Solid content ratio (%) | | |
|---|---|---|---|---|---|---|---|---|
| | | | | | | Upper portion | Lower portion | Difference |
| Example 1 | LYBC | Tetralin | — | $0.9 \times 10^{-3}$ | 0.54 | 7.7 | 23.2 | 15.5 |
| Example 2 | LYBC | Ethylbenzene | — | $0.9 \times 10^{-3}$ | 0.54 | 11.9 | 21.6 | 9.7 |
| Example 3 | LYBC | Mesitylene | — | $0.9 \times 10^{-3}$ | 0.66 | 10.2 | 23.8 | 13.6 |
| Example 4 | LYBC | Pseudocumene | — | $0.8 \times 10^{-3}$ | 0.61 | 8.2 | 24.7 | 16.5 |
| Example 5 | LYBC | Xylene | — | $1.2 \times 10^{-3}$ | 0.60 | 11.1 | 22.0 | 10.9 |
| Example 6 | LYBC | Cumene | — | $0.8 \times 10^{-3}$ | 0.60 | 12.4 | 22.8 | 10.4 |
| Example 7 | LYBC | Anisole | Ether group | $0.8 \times 10^{-3}$ | 0.60 | 3.7 | 24.2 | 20.5 |
| Example 8 | LYBC | 1,2,4-Trichlorobenzene | Chloro group | $0.8 \times 10^{-3}$ | 0.54 | 19.2 | 19.5 | 0.3 |
| Example 9 | LYBC | Chlorobenzene | Chloro group | $0.8 \times 10^{-3}$ | 0.55 | 18.4 | 20.1 | 1.7 |
| Example 10 | LYBC | 2,4-Dichlorotoluene | Chloro group | $0.8 \times 10^{-3}$ | 0.90 | 19.0 | 20.8 | 1.8 |
| Example 11 | LYBC | o-Chlorotoluene | Chloro group | $1.0 \times 10^{-3}$ | 0.58 | 17.0 | 20.0 | 3.0 |
| Example 12 | LYBC | 1,3-Dichlorobenzene | Chloro group | $1.0 \times 10^{-3}$ | 0.55 | 18.3 | 20.6 | 2.3 |
| Example 13 | LYBC | p-Chlorotoluene | Chloro group | $1.0 \times 10^{-3}$ | 0.64 | 15.9 | 19.8 | 3.9 |
| Example 14 | LYBC | 1,2-Dichlorobenzene | Chloro group | $0.9 \times 10^{-3}$ | 0.51 | 18.0 | 20.8 | 2.8 |
| Example 15 | LYBC | 3,4-Dichlorotoluene | Chloro group | $0.9 \times 10^{-3}$ | 0.61 | 19.0 | 19.5 | 0.5 |
| Example 16 | LYBC | Dibutyl ether | Ether group | $0.4 \times 10^{-3}$ | 0.61 | 3.8 | 21.4 | 17.6 |
| Example 17 | LYBC | 1,4-Dichlorobutane | Chloro group | $0.4 \times 10^{-3}$ | 0.60 | 18.9 | 20.1 | 1.2 |
| Comparative Example 1 | LYBC | N,N-Dimethylaniline | Amino group | $0.02 \times 10^{-3}$ | — | — | — | — |
| Comparative Example 2 | LYBC | 2-Ethyl-1-hexanol | Hydroxy group | — | — | — | — | — |
| Comparative Example 3 | LYBC | Tetraethyl orthosilicate | — | — | — | — | — | — |
| Comparative Example 4 | LPS | Tetralin | — | $5.8 \times 10^{-4}$ | 1.55 | — | — | — |

Discussion

As is clear from Table 1, the solid electrolyte particles of each of Examples 1 to 17 have an average particle size of less than or equal to 1 μm. The solid electrolyte particles of Examples 1 to 17 are formed from solid electrolyte compositions including a halide solid electrolyte material and an organic solvent consisting of at least one selected from the group consisting of a compound including an ether group or a halogen group and a hydrocarbon. From the results, the solid electrolyte materials included in the solid electrolyte compositions of Examples 1 to 17 inferentially also had average particle sizes of less than or equal to 1 μm. Furthermore, as is clear from Table 1, in the solid electrolyte compositions according to Examples 1 to 17, the decrease in the ion conductivity of the solid electrolyte materials was sufficiently suppressed.

As is clear from comparison of Examples 1 to 15 with Examples 16 and 17, use of an organic solvent being an aromatic compound resulted in further suppression of the decrease in the ion conductivity due to grinding of the halide solid electrolyte material.

As is clear from comparison of Examples 8 to 15 and 17 with Examples 1 to 7 and 16, use of an organic solvent being a compound having a chloro group resulted in a solid electrolyte composition having higher dispersibility.

As has been described, the solid electrolyte composition according to the present disclosure is suitable for obtaining a battery having high ion conductivity and high energy density.

The solid electrolyte composition according to the present disclosure is applied to, for example, an all-solid-state lithium secondary battery.

REFERENCE SIGNS LIST

101 solid electrolyte particles
200 pressure-molding die
201 upper punch
202 die
203 lower punch

What is claimed is:

1. A solid electrolyte composition comprising consisting essentially of:
   a halide solid electrolyte material; and
   an organic solvent,
   wherein the halide solid electrolyte material has an average particle size of less than or equal to 1 μm,
   the organic solvent consists of at least one selected from the group consisting of a compound having a functional group and a hydrocarbon, and
   the functional group is at least one selected from the group consisting of an ether group and a halogen group.

2. The solid electrolyte composition according to claim 1, wherein the organic solvent is the compound having the halogen group.

3. The solid electrolyte composition according to claim 2, wherein the halogen group is a chloro group.

4. The solid electrolyte composition according to claim 1, wherein the organic solvent is at least one selected from the group consisting of an aromatic compound having the functional group and an aromatic hydrocarbon.

5. The solid electrolyte composition according to claim 1, wherein the halide solid electrolyte material has lithium-ion conductivity, and
   is formed from:
      at least one selected from the group consisting of Mg, Ca, Sr, Ba, Zn, Sn, Al, Sc, Ga, Bi, Sb, Zr, Hf, Ti, Ta, Nb, W, Y, Gd, Tb, and Sm, and
      at least one selected from the group consisting of F, Cl, Br, and I.

6. The solid electrolyte composition according to claim 5, wherein the halide solid electrolyte material includes-is formed from:

at least one selected from the group consisting of F, Cl, Br, and I,

Li, and

Y.

7. The solid electrolyte composition according to claim 6, wherein the halide solid electrolyte material includes is formed from: Li, Y, Cl, and Br.

8. The solid electrolyte composition according to claim 7, wherein the halide solid electrolyte material is $Li_3YBr_2Cl_4$.

9. The solid electrolyte composition according to claim 1, wherein the organic solvent is at least one selected from the group consisting of tetralin, ethylbenzene, mesitylene, pseudocumene, xylene, cumene, anisole, 1,2,4-trichlorobenzene, chlorobenzene, 2,4-dichlorotoluene, o-chlorotoluene, 1,3-dichlorobenzene, p-chlorotoluene, 1,2-dichlorobenzene, 3,4-dichlorotoluene, dibutyl ether, and 1,4-dichlorobutane.

10. Solid electrolyte particles being a solidified product of the solid electrolyte composition according to claim 1.

11. The solid electrolyte particles according to claim 10, having an average particle size of less than or equal to 1 μm.

\* \* \* \* \*